US011293575B2

(12) United States Patent
Hasunuma

(10) Patent No.: US 11,293,575 B2
(45) Date of Patent: Apr. 5, 2022

(54) FLUID TRANSFER CONNECTOR PLUG, FLUID TRANSFER CONNECTOR SOCKET, FLUID TRANSFER CONNECTOR, AND METHOD FOR CONNECTING FLUID TRANSFER CONNECTOR

(71) Applicant: Surpass Industry Co., Ltd., Saitama (JP)

(72) Inventor: Masahiro Hasunuma, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 94 days.

(21) Appl. No.: 16/441,328

(22) Filed: Jun. 14, 2019

(65) Prior Publication Data

US 2020/0018434 A1    Jan. 16, 2020

(30) Foreign Application Priority Data

Jul. 13, 2018   (JP) .............................. JP2018-133180

(51) Int. Cl.

| | |
|---|---|
| *F16L 37/60* | (2006.01) |
| *F16L 37/244* | (2006.01) |
| *F16L 37/23* | (2006.01) |
| *F16L 37/08* | (2006.01) |

(52) U.S. Cl.
CPC .............. *F16L 37/60* (2013.01); *F16L 37/08* (2013.01); *F16L 37/23* (2013.01); *F16L 37/244* (2013.01)

(58) Field of Classification Search
CPC ....... F16L 37/23; F16L 37/60; F16L 2201/40; F16L 2201/60; F16L 37/08; F16L 37/244

USPC .......................................................... 285/93
See application file for complete search history.

(56) References Cited

U.S. PATENT DOCUMENTS

| | | | | |
|---|---|---|---|---|
| 2,935,338 | A * | 5/1960 | Mills, Jr. ................. | F16L 37/23 251/149.5 |
| 3,287,031 | A * | 11/1966 | Simmons ........... | H01R 13/6456 285/27 |
| 4,139,222 | A * | 2/1979 | Loland ................... | F16L 37/248 285/12 |
| 4,211,439 | A * | 7/1980 | Moldestad ............ | F16L 37/113 285/27 |
| 6,527,305 | B1 * | 3/2003 | Smith .................... | B67D 7/344 285/24 |
| 7,014,221 | B2 * | 3/2006 | Iwasaki ............... | F16L 37/0985 285/282 |
| 9,157,560 | B2 * | 10/2015 | Rehder ................... | F16L 37/32 |
| 9,291,292 | B2 * | 3/2016 | Gauss ..................... | F16L 21/00 |

(Continued)

FOREIGN PATENT DOCUMENTS

JP          5046958 B     10/2012

*Primary Examiner* — David Bochna

(74) *Attorney, Agent, or Firm* — Hamilton, Brook, Smith & Reynolds, P.C.

(57) ABSTRACT

Provided is a fluid transfer connector plug that allows for easy engagement of keys with key grooves. The fluid transfer connector plug includes: a plug body having a proximal end and a distal end, the proximal end allowing a hose to be fixed thereto, the distal end being removably connected to a socket, the plug body including a fluid channel communicating with the hose; a key plate on an outer periphery of the plug body, the key plate being rotatable relative to the plug body; and two or more keys on the key plate. The plug further includes a main key having a larger circumferential width than that of each of the other keys.

8 Claims, 13 Drawing Sheets

(56) References Cited

U.S. PATENT DOCUMENTS 10,711,930 B2 * 7/2020 Lewis ................ F16L 37/0841
2009/0272450 A1 11/2009 Hasunuma

* cited by examiner

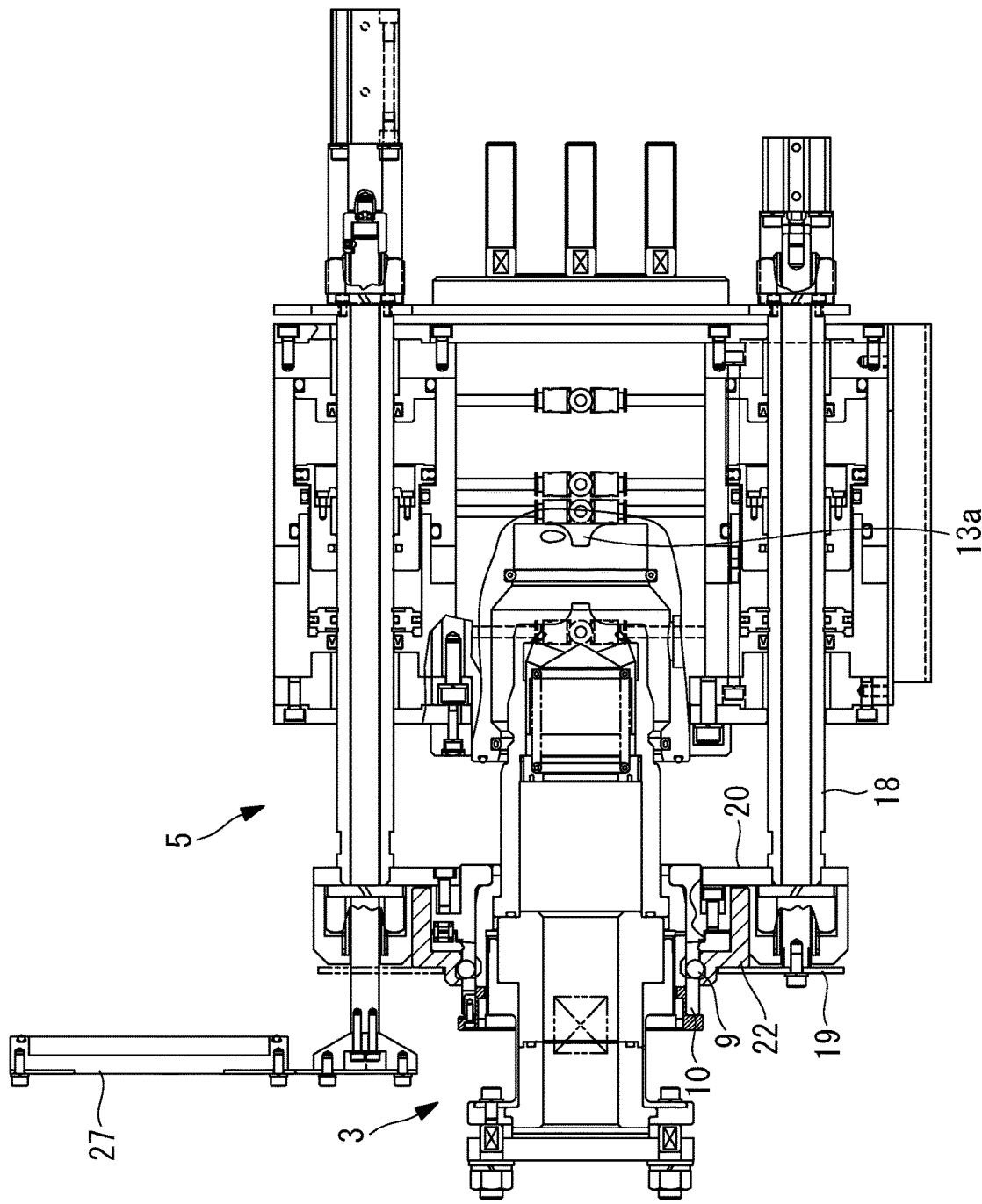

FLUID TRANSFER CONNECTOR PLUG, FLUID TRANSFER CONNECTOR SOCKET, FLUID TRANSFER CONNECTOR, AND METHOD FOR CONNECTING FLUID TRANSFER CONNECTOR

CROSS-REFERENCE TO RELATED APPLICATIONS

This application claims priority under 35 U.S.C. § 119 or 365 to Japanese, Application No. 2018-133180, filed Jul. 13, 2018. The entire teachings of the above application are incorporated herein by reference.

TECHNICAL FIELD

The present disclosure relates to a fluid transfer connector plug, a fluid transfer connector socket, and a fluid transfer connector to transfer, for example, liquid chemicals or gas for use in semiconductor manufacturing apparatuses, and also relates to a method for connecting the fluid transfer connector.

BACKGROUND ART

A fluid transfer connector is used to transfer a fluid (liquid chemical or gas) for use in semiconductor manufacturing apparatuses, as disclosed in, for example, PTL 1. The fluid transfer connector may include a socket and a plug. The socket may be fixed to a building in which a buffer tank for temporarily storing the fluid is installed. The plug may be fixed to a distal end of a hose extended from a tanker truck. Connecting the plug to the socket enables the fluid to be transferred from the tanker truck to the buffer tank.

CITATION LIST

Patent Literature

[PTL 1]
The Publication of Japanese Patent No. 5046958.

SUMMARY

Technical Problem

There are various kinds of fluids for use in semiconductor manufacturing apparatuses, and a unique combination of a plug and a socket is provided for each individual kind of fluids. To ensure that a plug and a socket are connected in the unique combination, a key and a key groove for preventing wrong connection are used. In general, the key and the key groove can work sufficiently as long as they are fixed at predetermined positions on the plug and the socket. However, when a hose to which the plug is fixed has a high rigidity (e.g., when the hose has an inner diameter of 25 mm or more), a large force is required to rotate the plug with the hose and thereby engage the key with the key groove, which is burden on workers.

The present disclosure has been made in view of the above circumstances, and aims to provide a fluid transfer connector plug, a fluid transfer connector socket, a fluid transfer connector, and a method for connecting the fluid transfer connector each of which allows to easily engage the key with the key groove.

Solution to Problem

According to a first aspect of the present disclosure, there is provided a fluid transfer connector plug comprising: a plug body having a proximal end and a distal end, the proximal end allowing a hose to be fixed thereto, the distal end being removably connected to a socket, the plug body including a fluid channel communicating with the hose; a ring body on an outer periphery of the plug body, the ring body being rotatable relative to the plug body; and two or more keys or two or more key grooves on the ring body.

The plug is inserted into the socket to connect them, whereby a fluid channel communicates between the plug and the socket.

The ring body includes two or more keys or two or more key grooves. This ensures a one-to-one correspondence between the plug and the socket, helping to avoid wrong connection.

The plug body includes on its outer periphery the ring body rotatable relative to the plug body. This eliminates the need for rotating the plug body and, moreover, the hose fixed to the plug body, in order to position the keys or the key grooves with respect to the key grooves or the keys on the socket. This can relieve workers of a heavy burden of rotating the plug with the hose to position the keys with respect to the key grooves. In particular, the hose used to transfer a liquid chemical from the tanker truck is thick (e.g., inner diameter of 25 mm or more), and accordingly the work can be extremely easy.

The ring body may be rotatable in a predetermined angle range; alternatively, the ring body may be 360° revolvable.

In the first aspect of the present disclosure, the fluid transfer connector plug further comprises a main key or a main key groove, the main key or the main key groove having a larger width in the rotational direction of the ring body than a width of each of the other keys or the key grooves in the rotational direction of the ring body.

One of the keys or the key grooves has a larger width in the rotational direction than that of the other keys or the other key grooves, making it recognizable as a main key or a main key groove. This allows to easily position the ring body in the rotational direction by using the main key or the main key groove as a reference.

According to a second aspect of the present disclosure, there is provided a fluid transfer connector socket connected with the aforementioned fluid transfer connector plug, and the socket comprises key grooves or keys respectively corresponding to the keys or the key grooves of the plug.

The socket includes the key grooves or the keys respectively corresponding to the keys or the key grooves of the aforementioned plug. This ensures correspondence between the socket and the plug.

According to a third aspect of the present disclosure, there is provided a fluid transfer connector comprising the aforementioned fluid transfer connector plug and the aforementioned fluid transfer connector socket.

The plug is connected to the socket by use of the keys or the key grooves on the rotating ring body. Thus, use of this fluid transfer connector can avoid wrong connection by easily engaging the keys with the key grooves for connection of the plug.

According to a fourth aspect of the present disclosure, there is provided a method for connecting a fluid transfer connector, the method comprising: connecting a fluid transfer connector plug to a fluid transfer connector socket, the plug comprising: a plug body including a proximal end and a distal end, the proximal end allowing a hose to be fixed thereto, the distal end being removably connected to the socket, the plug body including a fluid channel communicating with the hose; a ring body on an outer periphery of the plug body, the ring body being rotatable relative to the plug body; and two or more keys or two or more key grooves on the ring body, the socket comprising key grooves or keys respectively corresponding to the keys or the key grooves of the plug, wherein the connecting the plug to the socket is performed after engaging the keys or the key grooves of the plug with the key grooves or the keys of the socket by rotating the ring body.

The ring body is rotated to engage the keys with the key grooves before the plug is connected to the socket. This allows for easy engagement of the keys with the key grooves for connection of the plug.

In the fourth aspect of the present disclosure, there is provided a method for connecting a fluid transfer connector, wherein the plug comprises a main key or a main key groove, the main key or the main key groove having a larger width in the rotational direction of the ring body than a width of each of the keys or the key grooves in the rotational direction of the ring body, the socket comprises a main key groove or a main key respectively corresponding to the main key or the main key groove of the plug, and the connecting the plug to the socket is performed after rotating the ring body such that the main key or the main key groove of the plug is positioned at a vertically upper position.

One of the keys or the key grooves has a larger width in the rotational direction than that of the other keys or the other key grooves, making it recognizable as a main key or a main key groove. This allows to easily position the ring body in the rotational direction by using the main key or the main key groove as a reference. Further, positioning the main key or the main key groove at a vertically upper position allows a worker to easily recognize the main key or the main key groove from above. The worker can thus connect the plug without feeling any trouble.

Advantageous Effects

The plug body includes on its outer periphery the ring body rotatable relative to the plug body, and the ring body includes the keys or the key grooves. This allows for easy engagement of the keys or the key grooves with corresponding key grooves or keys.

BRIEF DESCRIPTION OF DRAWINGS

FIG. 5B is a longitudinal-sectional view illustrating a state where the sleeve permits movement of the lock balls.

DESCRIPTION OF EMBODIMENTS

An embodiment of the present disclosure will be described below with reference to the drawings.

Figure 1:
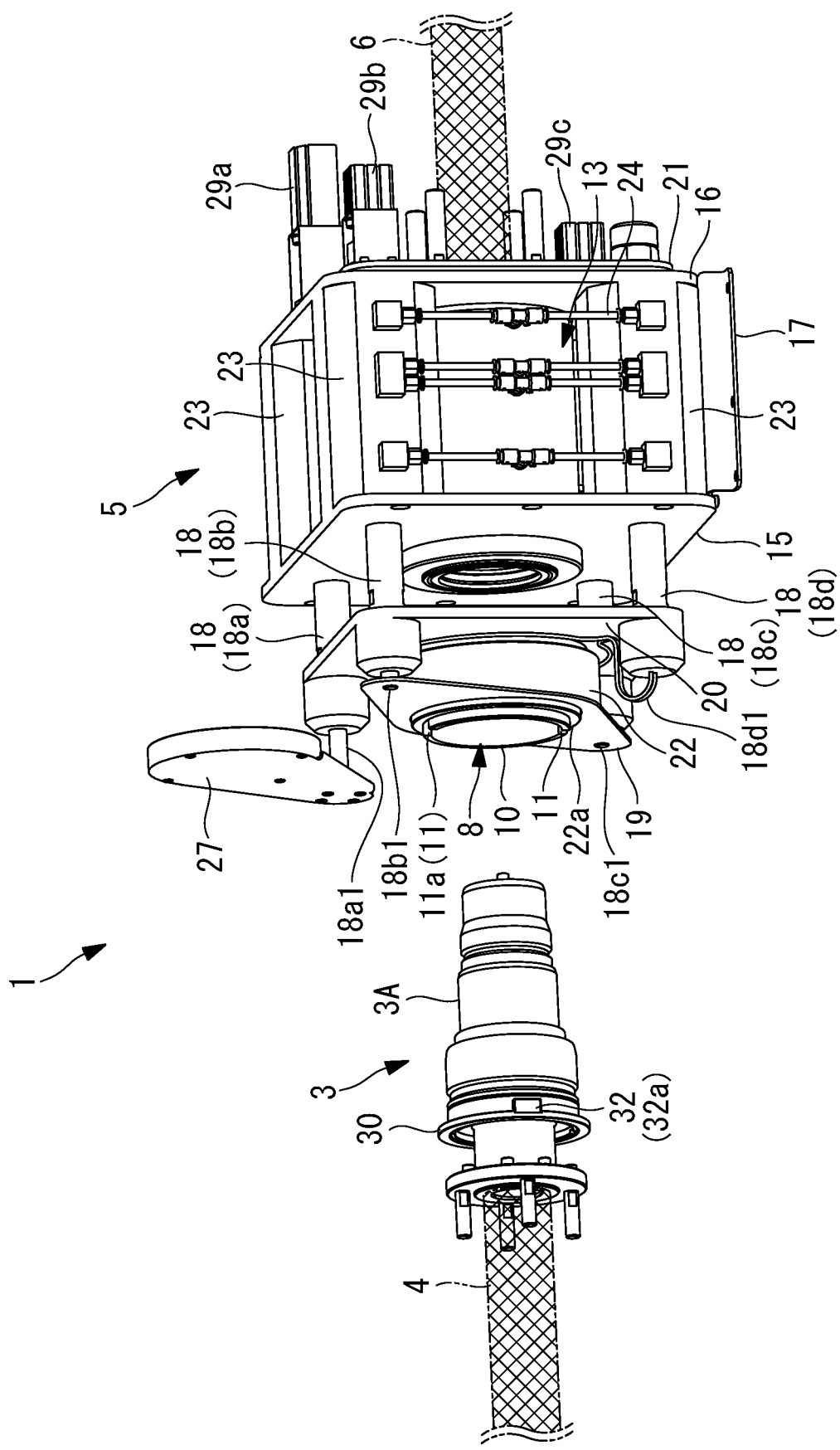
FIG. 1 is a perspective view of a fluid transfer connector according to an embodiment of the present disclosure.

FIG. 1 depicts a plug 3 and a socket 5 according to the present embodiment. The plug 3 and the socket 5 are used as a fluid transfer connector 1. Examples of fluids used herein include liquid chemicals and gas for use in semiconductor manufacturing apparatuses.

The socket 5 is fixed on a wall of a building, and one end of a pipe 6 is connected to a rear end of the socket 5. The other end of the pipe 6 is connected to a buffer tank (not shown in the figure) installed inside the building. The socket 5 includes an insertion port 8 at its front end (left end in FIG. 5) to allow for insertion of the plug 3. The insertion port 8 is formed inside a cylindrical insertion cylinder 10. At a distal end of the insertion cylinder 10, there are multiple key grooves 11 formed by cutting out a part of the insertion cylinder 10. The key grooves 11 are arranged at predetermined intervals in a circumferential direction of the insertion cylinder 10. A key groove 11a located at a vertically upper position serves as a main key groove, having a larger circumferential width than that of the other key grooves 11.

The insertion cylinder 10 holds multiple lock balls 9 (see FIG. 4) spaced from each other in the circumferential direction. The lock balls 9 are used to fix the plug 3 to the socket 5.

Located at a rear side (right side in FIG. 1) of the insertion cylinder 10 is a socket body 13. The socket body 13 has a cylindrical shape with a horizontal central axis and includes therein a valve body 13a (see FIG. 5A etc.) for opening and closing a channel. A front fixing plate 15 and a rear fixing plate 16 are fixed to front and rear sides, respectively, of the socket body 13. The fixing plates 15, 16 are rectangular, vertically upright plates. Legs 17 are disposed below the fixing plates 15, 16 to fix the socket body 13 onto an installation surface. Four support shaft bodies 18 are extending in a horizontal direction so as to penetrate four corners of each of the fixing plates 15, 16.

Front and rear ends of each support shaft body 18 is fixed to a front support plate 20 and a rear support plate 21, respectively. The support plates 20, 21 are rectangular, vertically upright plates. The front support plate 20 supports the aforementioned insertion cylinder 10.

Each support shaft body 18 is mounted with a cylinder 23. Each cylinder 23 is fixed between the front fixing plate 15 and the rear fixing plate 16. An air supply pipe 24 is connected to each cylinder 23, and air pressure supplied from the air supply pipe 24 causes the corresponding support shaft body 18 to reciprocate in the axial direction relative to the cylinder 23. This in turn causes the insertion cylinder 10, which is supported by the front support plate 20, to move closer to or away from the socket body 13.

A lid 27 is attached to a first support shaft body 18a, which is one of the two upper support shaft bodies 18. Specifically, a lid driving shaft body 18a1 axially penetrates the inside of the first support shaft body 18a, and the lid 27 is fixed to a front end of the lid driving shaft body 18a1. The lid driving shaft body 18a1 is reciprocated in forward and backward directions (the axial direction) and rotated around the axis by a first actuator 29a provided at a rear end of the first support shaft body 18a. Operation of the first actuator 29a is controlled by a controller (not shown in the figure).

Figure 2:
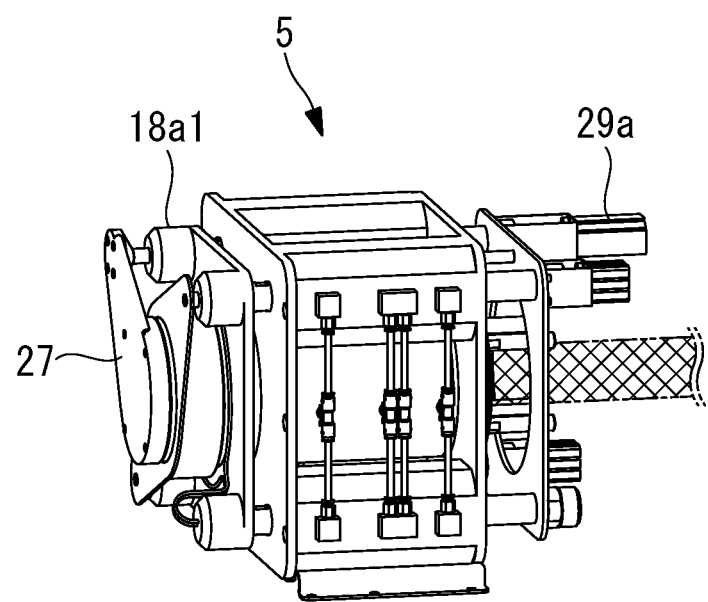
FIG. 2 is a perspective view of a socket when its lid is closed.

The lid 27 is used to close the insertion port 8 when the fluid transfer connector 1 is not in use and the plug 3 is removed from the socket 5. FIG. 2 illustrates the lid 27 when it is closed. Closing the insertion port 8 with the lid 27 allows to prevent contamination of the fluid. Additionally, closing the insertion port 8 with the lid 27 during non-use of the fluid transfer connector 1 allows to prevent contamination of the channel between the lid 27 and the valve body inside the socket body 13.

As shown in FIG. 1, a sleeve driving plate 19 is attached to a second support shaft body 18b, which is the other of the two upper support shaft bodies 18, and a third support shaft body 18c, which is located diagonally to the second support shaft body 18b across the insertion cylinder 10. Specifically, the sleeve driving plate 19 is fixed to front ends of a sleeve driving plate shaft body 18b1 penetrating the second support shaft body 18b along the central axis and a sleeve driving plate shaft body 18c1 penetrating the third support shaft body 18c along the central axis. The sleeve driving plate shaft bodies 18b1, 18c1 are reciprocated in forward and backward directions (the axial direction) by a second actuator 29b and a third actuator 29c, respectively, provided at the respective rear ends of the support shaft bodies 18b1, 18c1. Operation of the actuators 29b, 29c are controlled by the controller (not shown in the figure).

The sleeve driving plate 19 is a substantially diamond-shaped plate having an opening at the center thereof. The opening of the sleeve driving plate 19 allows for insertion of a distal end 22a of a cylindrical sleeve 22. As shown in the lower part of FIG. 4, the sleeve 22 is positioned to cover an outer periphery of the insertion cylinder 10 and reciprocates in the axial direction relative to the insertion cylinder 10. The sleeve driving plate 19 is operative to displace the sleeve 22 when the plug 3 is unfixed and removed from the socket 5. Specifically, the sleeve 22 restricts the lock balls 9 from moving radially outward as shown in FIG. 5A. Then, as shown in FIG. 5B, the sleeve driving plate 19 is drawn toward the front support plate 20 (to the right side in FIG. 5B) to displace the sleeve 22. This permits the lock balls 9 to move radially outward and unlocks the plug 3. To fix the plug 3 to the socket 5, the lock balls 9 are rolled into, and engaged with, a recess 39a of a first fixing ring 39 as the plug 3 is inserted into the insertion cylinder 10. At this time, the sleeve driving plate 19 is not operative. The lock balls 9, the sleeve 22 and other relevant elements thus constitute a locking mechanism that locks the plug 3 to the insertion cylinder 10, namely the socket 5.

As shown in FIG. 1, a fourth support shaft body 18d is disposed below the second support shaft body 18b and laterally to the third support shaft body 18c. A sensor wire 18d1 is connected from the inside of the fourth support shaft body 18d to the inside of the sleeve 22. At a distal end of the sensor wire 18d1, there is a sensor (not shown in the figure) composed of a pair of a light-emitting element (e.g., an LED) and a light-receiving element. The sensor detects whether the plug 3 is inserted into an appropriate position within the insertion cylinder 10. Outputs from the sensor are transmitted to the controller (not shown in the figure) through the sensor wire 18d1.

The controller may be composed of, for example, a central processing unit (CPU), a random-access memory (RAM), a read only memory (ROM), and a computer-readable storage medium. For example, a set of processes to provide various functions is stored in the storage medium or other equivalents in the form of a program. The CPU loads this program onto the RAM or other memories to execute information processing and calculations, whereby various functions are provided. The program may be pre-installed on the ROM or other storage media, may be provided in a computer-readable storage medium, or may be provided via wired or wireless communication means. Examples of the computer-readable storage medium include a magnetic disk, a magneto-optical disk, a CD-ROM, a DVD-ROM, and a semiconductor memory.

As shown in FIG. 1, the plug 3 is substantially cylindrical and includes a channel inside thereof to permit the flow of fluid. One end of a hose 4 is connected to a proximal end (the left side in FIG. 1) of the plug 3. The other end of the hose 4 is fixed to a tanker truck (not shown in the figure). The hose 4 has an inner diameter of 25 mm or more, preferably 50 mm or more.

Figure 3:
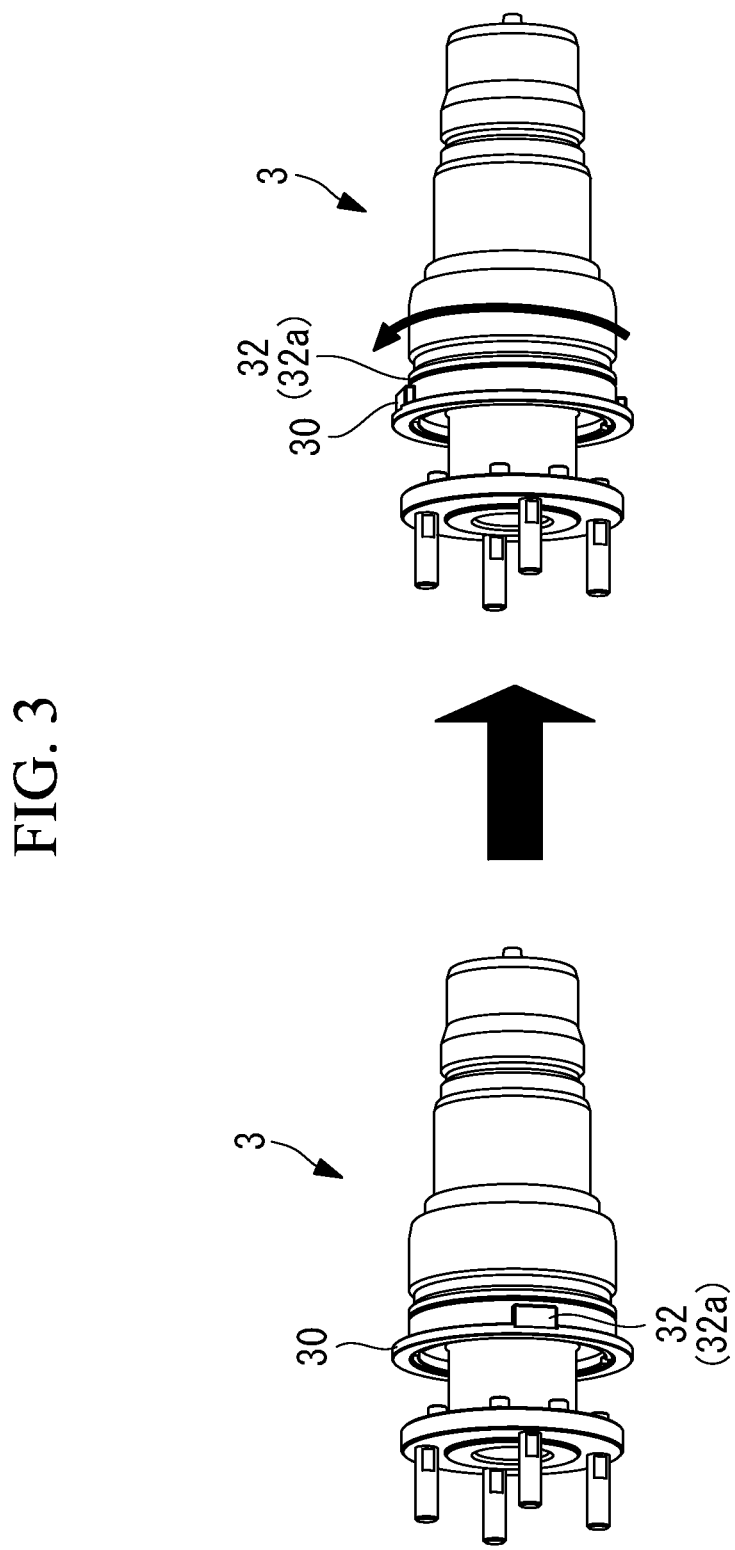
FIG. 3 is a perspective view of a plug when its key plate is rotated.

A key plate (ring body) 30 is attached to a rear part of the plug 3. The key plate 30 is in the form of an endless ring. At multiple locations on the circumference of the key plate 30, there are keys 32 protruding to the distal end side (the right side in FIG. 1). One of the multiple keys 32 is a main key 32a having a larger circumferential width than that of the other keys 32. The key plate 30 is revolvable around the axis relative to a plug body 3A. This allows workers to manually rotate the key plate 30 to position the main key 32a at a vertically upper position, which is a desired position, as shown in FIG. 3.

Figure 4:
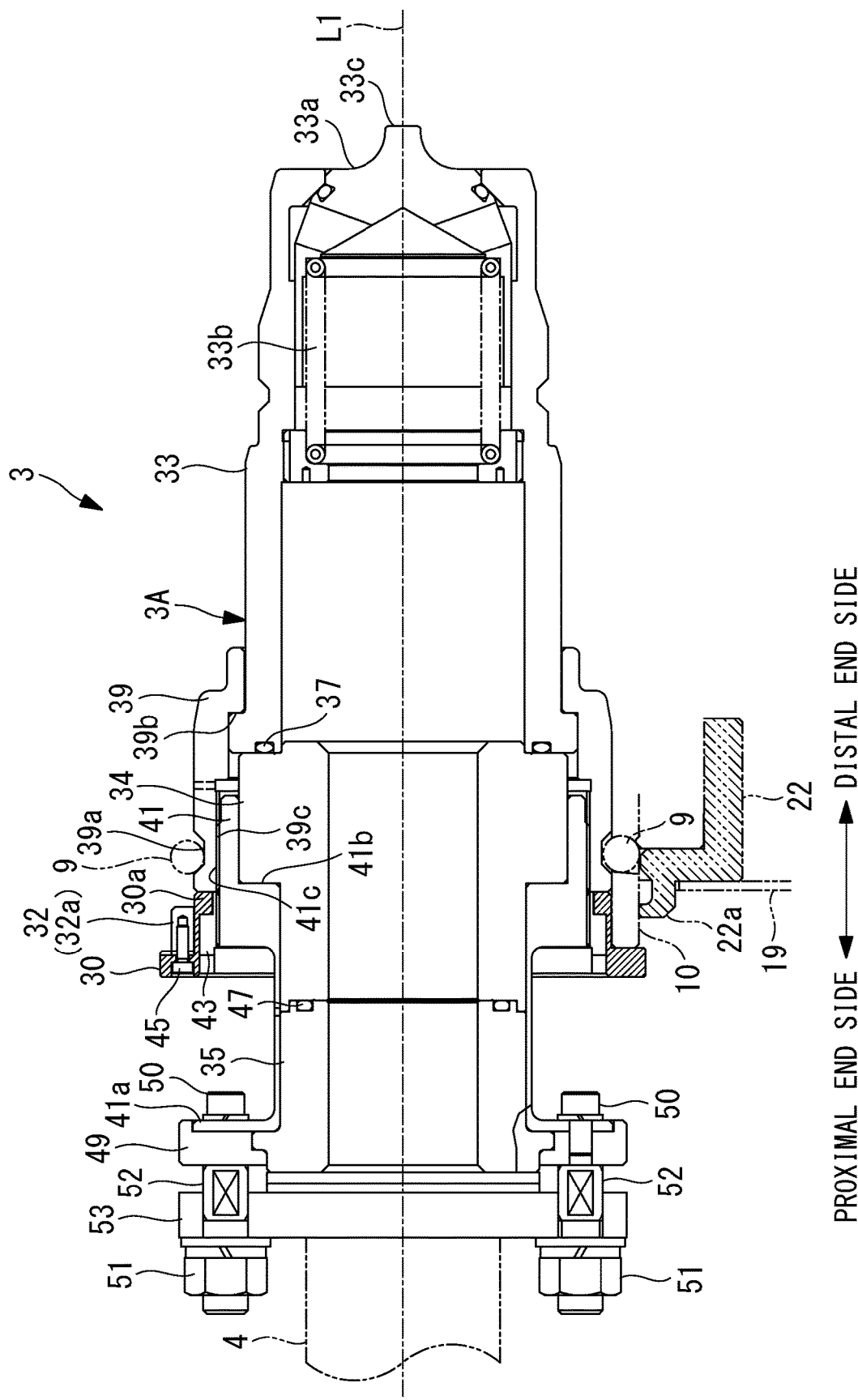
FIG. 4 is a longitudinal-sectional view of the plug.
Figure 5A:
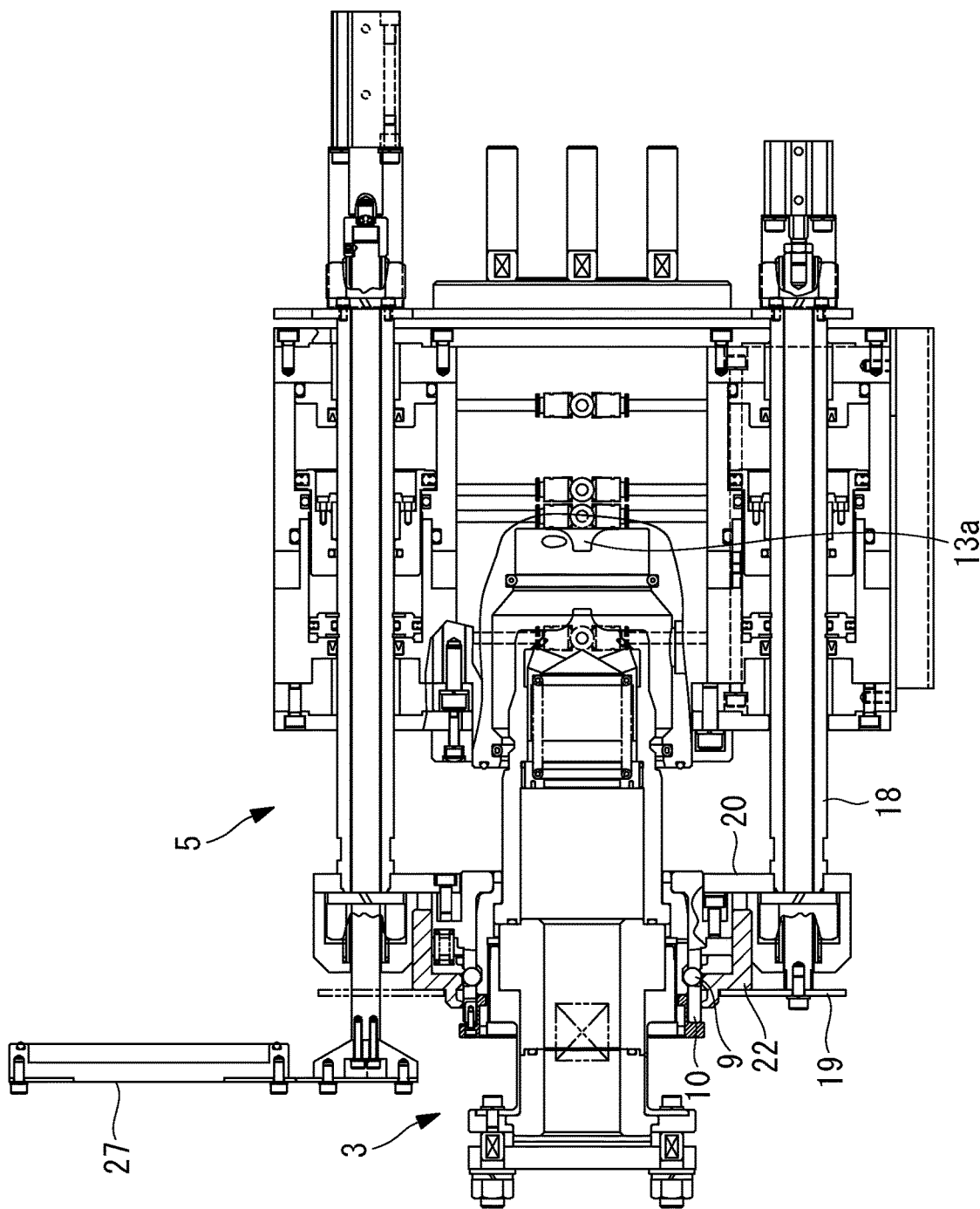
FIG. 5A is a longitudinal-sectional view illustrating a state where a sleeve restricts movement of lock balls.

FIG. 4 is a longitudinal-sectional view of the plug 3. The lower part of FIG. 4 depicts the lock ball 9, the insertion cylinder 10, the sleeve 22 and the sleeve driving plate 19, which are components of the socket 5.

The plug body 3A includes a distal cylinder 33, an intermediate cylinder 34, and a proximal cylinder 35 in this order from its distal end (the right side in FIG. 4). These cylinders 33, 34 and 35 are connected along the same plug central axis L1, forming a channel inside of them to permit the flow of fluid.

A valve body 33a is contained in the distal cylinder 33. The valve body 33a is pushed by a spring 33b toward a distal end side of the distal cylinder 33. This causes the valve body 33a to close a distal opening of the distal cylinder 33. The valve body 33a is provided with a protrusion 33c at the center of the distal end thereof. The protrusion 33c protrudes toward the distal end side along the plug central axis L1. When the plug 3 is connected to the socket 5, the protrusion 33c abuts against an opposing protrusion (not shown in the figure) of the valve body of the socket 5. This abutment of the protrusion 33c of the plug 3 against the protrusion of the valve body of the socket 5 causes the valve body 33a to overcome the pressing force of the spring 33b and retract toward the proximate end side, which results in the channel inside the plug 3 being opened.

A proximal end (left side) of the distal cylinder 33 and a distal end of the intermediate cylinder 34 are faced to each other and connected in a fitting-in manner. An O-ring 37 is disposed between the distal cylinder 33 and the intermediate cylinder 34 to seal them liquid-tight or air-tight.

A first fixing ring 39 covers an outer periphery of the proximal end of the distal cylinder 33. The first fixing ring 39 includes the circumferential recess 39a along its outer periphery. When the plug 3 is connected to the socket 5, the lock balls 9 held by the insertion cylinder 10 are moved by the sleeve 22 radially inward to fit into the recess 39a. By engagement of the lock balls 9 into the recess 39a, the plug 3 is fixed to the socket 5. The first fixing ring 39 includes a stepped shoulder 39b on its inner periphery. The shoulder 39b is engaged with a large-diameter part at the proximal end of the distal cylinder 33. The first fixing ring 39 includes a female threaded part 39c on its proximal inner periphery.

A second fixing ring 41 almost entirely covers an outer periphery of the intermediate cylinder 34. The second fixing ring 41 includes a stepped shoulder 41b on its inner periphery. The shoulder 41b is engaged with a large-diameter part at a distal end of the intermediate cylinder 34. The second fixing ring 41 includes a male threaded part 41c on its distal outer periphery. Screwing the male threaded part 41c of the second fixing ring 41 into the female threaded part 39c of the first fixing ring 39 fixes the distal cylinder 33 and the intermediate cylinder 34 with each other.

The male threaded part 41c of the second fixing ring 41 is screwed with a lock nut 43 from the proximal end side. The lock nut 43 is fixed at a position abutting against the proximal end of the first fixing ring 39. The lock nut 43 is positioned within the inner periphery of the key plate 30. A proximal end of the lock nut 43 is located on the distal end side relative to a proximal end of the key plate 30. This results in the lock nut 43 being accommodated in the key plate 30, so that the lock nut 43 does not protrude from the proximal end of the key plate 30.

The distal outer periphery of the lock nut 43 is smaller in diameter than its proximal outer periphery. This forms a groove between the lock nut 43 and the proximal end of the first fixing ring 39, and an inward-protruding, small-diameter part 30a at the distal end of the key plate 30 is inserted into the groove. The length of the small-diameter part 30a in the plug central axis L1 direction is smaller than that of the groove into which the small-diameter part 30a is inserted. This loose-fitting of the small-diameter part 30a of the key plate 30 in the groove allows the key plate 30 to move freely in the revolution direction while regulating the position of the key plate 30 in the plug central axis L1 direction.

Each key 32 is fixed to the key plate 30 with a bolt 45. The bolt 45 is inserted into the key plate 30 and the key 32 from the proximal end side to the distal end side. Fixing with the bolt 45 is not the only method to fix the key 32; for example, the key plate 30 and the key 32 may be integrally formed.

A proximal end of the intermediate cylinder 34 and a distal end of the proximal cylinder 35 are faced to each other and connected in a fitting-in manner. An O-ring 47 is disposed between the intermediate cylinder 34 and the proximal cylinder 35 to seal them liquid-tight or air-tight.

A flange 41a of the second fixing ring 41 at its proximal end is fixed to a proximal flange 49 with bolts 50. The proximal flange 49 is engaged with a proximal outer periphery of the proximal cylinder 35 and fixed in this state. The bolts 50 are screwed into the proximal flange 49. This fixes the proximal cylinder 35 to the intermediate cylinder 34 and the distal cylinder 33.

Multiple fixing bolts 52 are fixed to a proximal end face of the proximal flange 49. Each fixing bolt 52 penetrates a hose fixing flange 53 for fixing the hose 4 and has its end engaged with a nut 51. This fixes the hose fixing flange 53 to the proximal flange 49, whereby the hose 4 is fixed to the plug 3.

Figure 6:
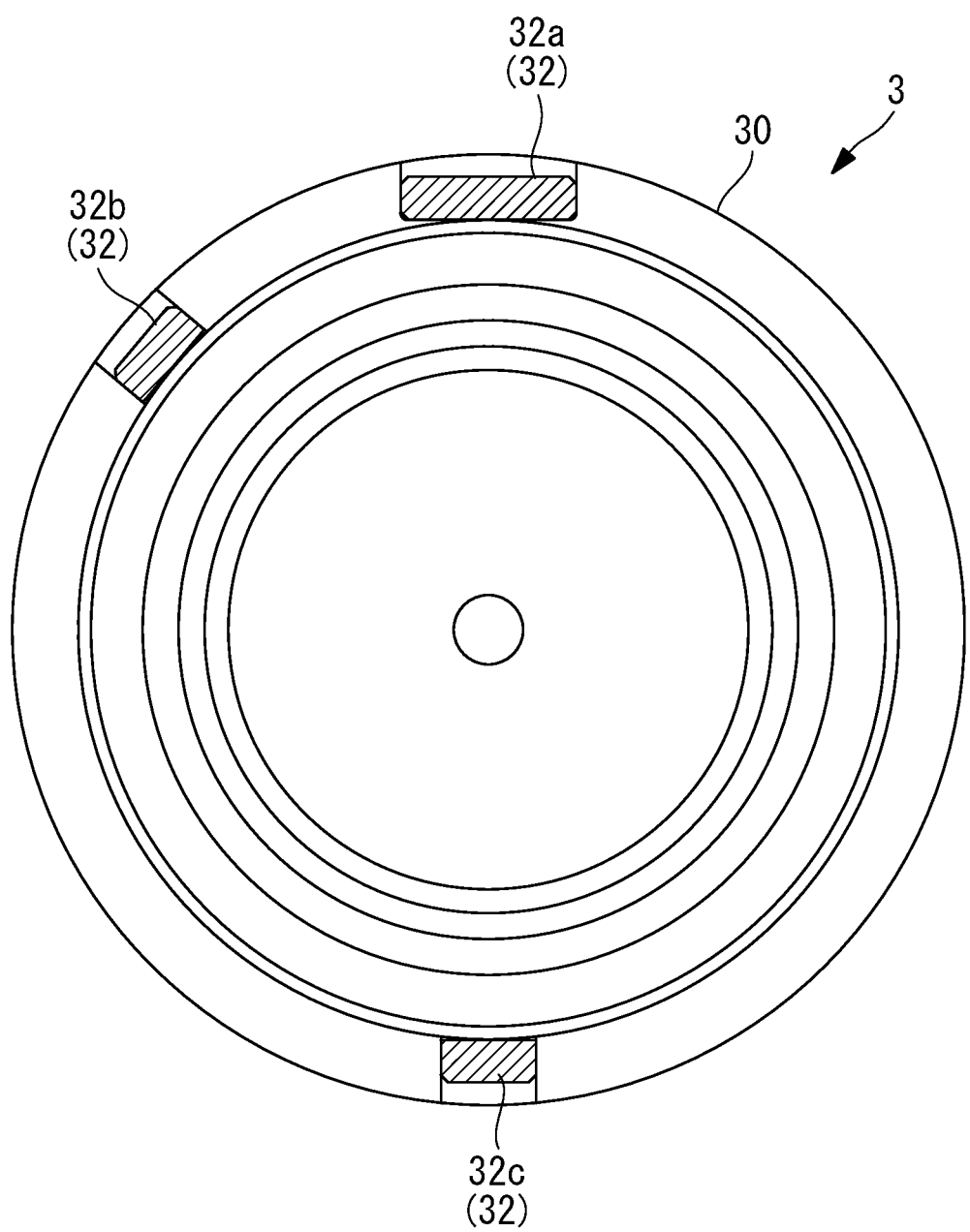
FIG. 6 is a front view illustrating positions of keys on the plug of FIG. 4.

FIG. 6 illustrates angle positions of the multiple keys 32 in the circumferential direction. The figure shows three keys 32. At the vertically upper position, namely at the twelve-o'clock position, the main key 32a is fixed to the key plate 30. FIG. 6 depicts the key plate 30 when it is revolved in the circumferential direction so as to situate the main key 32a at the twelve-o'clock position.

A first sub-key 32b is fixed to the key plate 30 at a position between the twelve-o'clock position and the nine-o'clock position. A second sub-key 32c is fixed to the key plate 30 at the six-o'clock position. The main key 32a has a circumferential width about twice as large as that of the first sub-key 32b and the second sub-key 32c. The first sub-key 32b and the second sub-key 32c have the same circumferential width, though they may have a different width.

Figure 7:
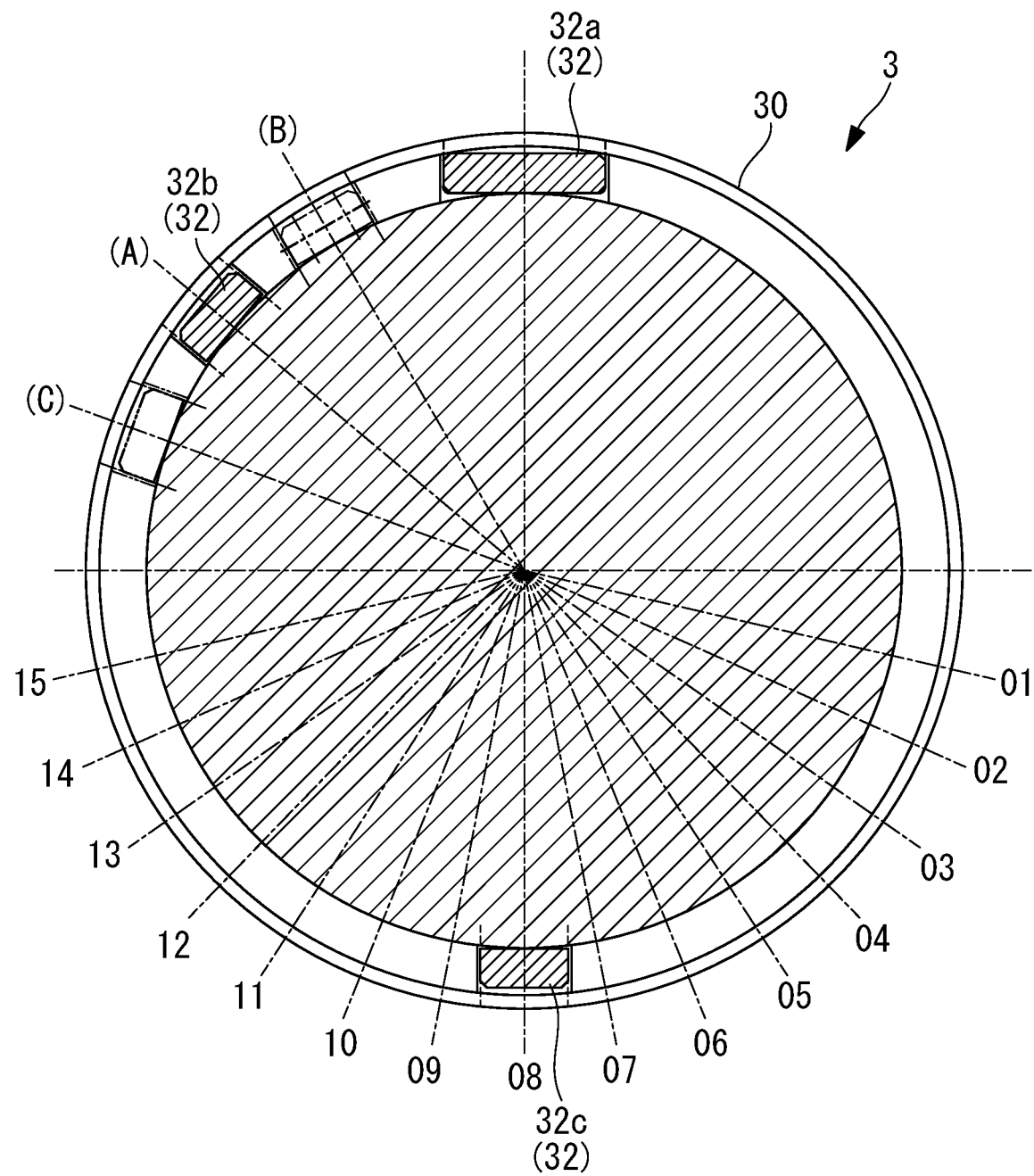
FIG. 7 is a front view illustrating optional positions of the keys.

Angle positions of the first sub-key 32b and the second sub-key 32c relative to the main key 32a are changeable according to the kind of fluid used. Specifically, the position of the first sub-key 32b is selectable from positions (A) to (C) shown in FIG. 7 according to a material (metal, resin etc.) of a member of each of the plug 3 and the socket 5 facing the channel for the fluid. Also, the position of the second sub-key 32c is selectable from positions (01) to (15) according to the kind (chemical species) of fluid. In this way, the positions of the keys 32 are individually selectable according to the material of the plug 3 and the socket 5 and the kind of fluid.

A description will now be given of operation to connect and disconnect the plug 3 to and from the socket 5.

<Connection Preparation Step>

As shown in FIG. 1, the plug 3 is first positioned to face the socket 5. Then, as shown in FIG. 3, the key plate 30 is manually rotated by a worker and positioned such that the main key 32a comes at a position easily visible by the worker from above, namely the vertically upper position.

<Insertion Step>

Figure 8:
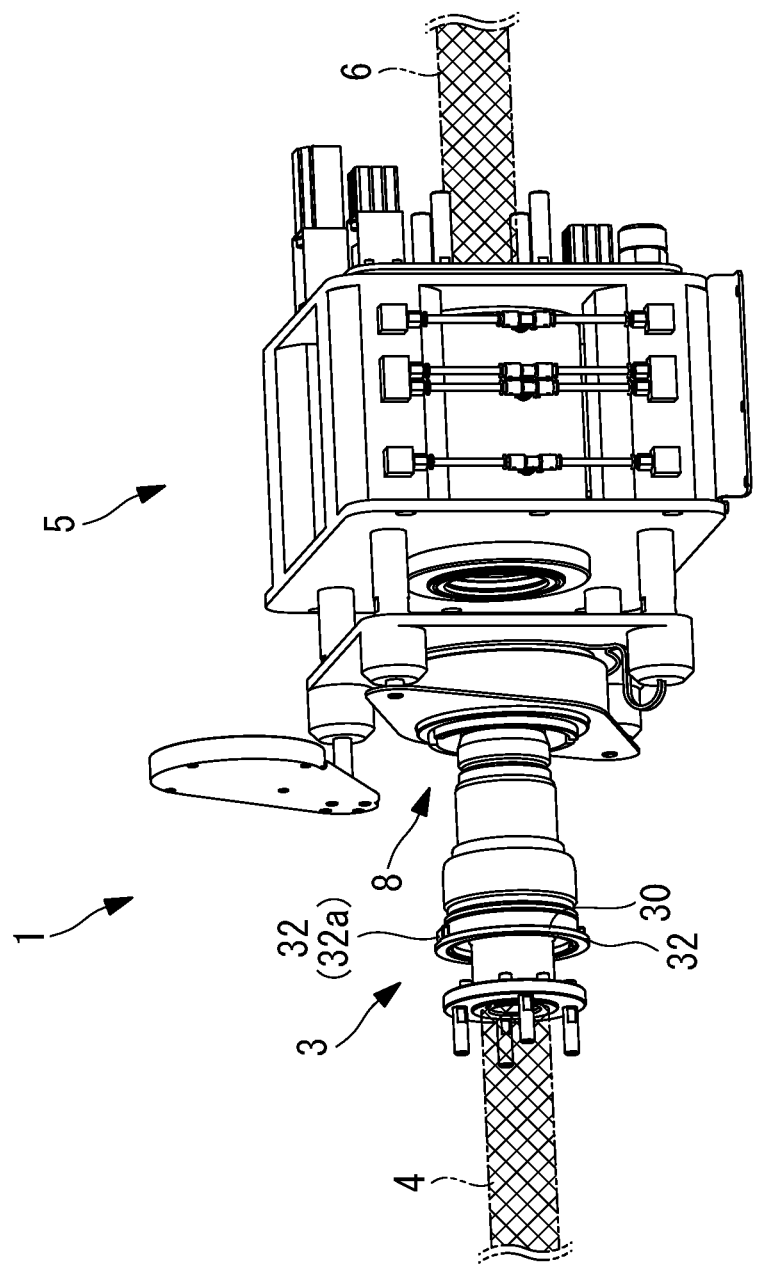
FIG. 8 is a perspective view illustrating insertion of a distal end of the plug into an insertion port of the socket.
Figure 9:
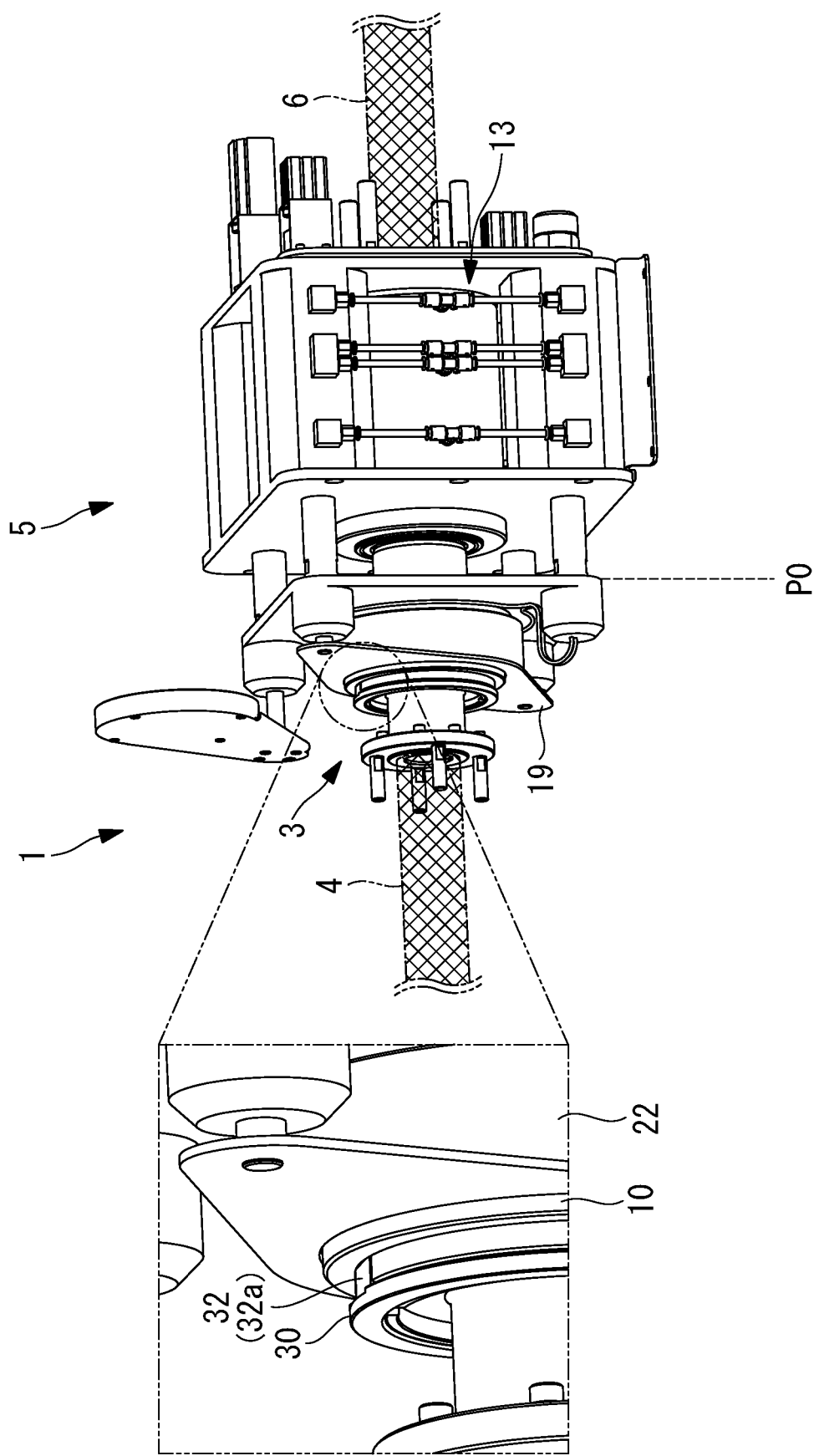
FIG. 9 is a perspective view illustrating engagement of the keys of the plug with key grooves of the socket.

After the key plate 30 is positioned, the distal end of the plug 3 is inserted into the insertion port 8 of the socket 5, as shown in FIG. 8. Inserting the plug 3 into the socket 5 further in the axial direction results in the keys 32 mating and engaging with the corresponding key grooves 11 on the insertion cylinder 10 of the socket 5, as shown in FIG. 9. The successful mating and engagement of the keys 32 with the key grooves 11 means that the plug 3 is the right type for the socket 5, helping to avoid wrong connection. Without the mating between the keys 32 and the key grooves 11, the plug 3 cannot be pushed against the socket 5 up to a connecting position. This enables the worker to recognize that the plug 3 is not the right type for the socket 5.

<Locking Step>

When the plug 3 is appropriately inserted into the insertion cylinder 10 by the mating between the keys 32 and the key grooves 11, pushing the plug 3 against the insertion cylinder 10 in the axial direction causes the lock balls 9 held by the insertion cylinder 10 to get into the recess 39a on the first fixing ring 39 of the plug 3, as shown in the lower part of FIG. 4. This fixes the plug 3 to the socket 5.

<Pre-Transfer Washing Step>

Figure 10:
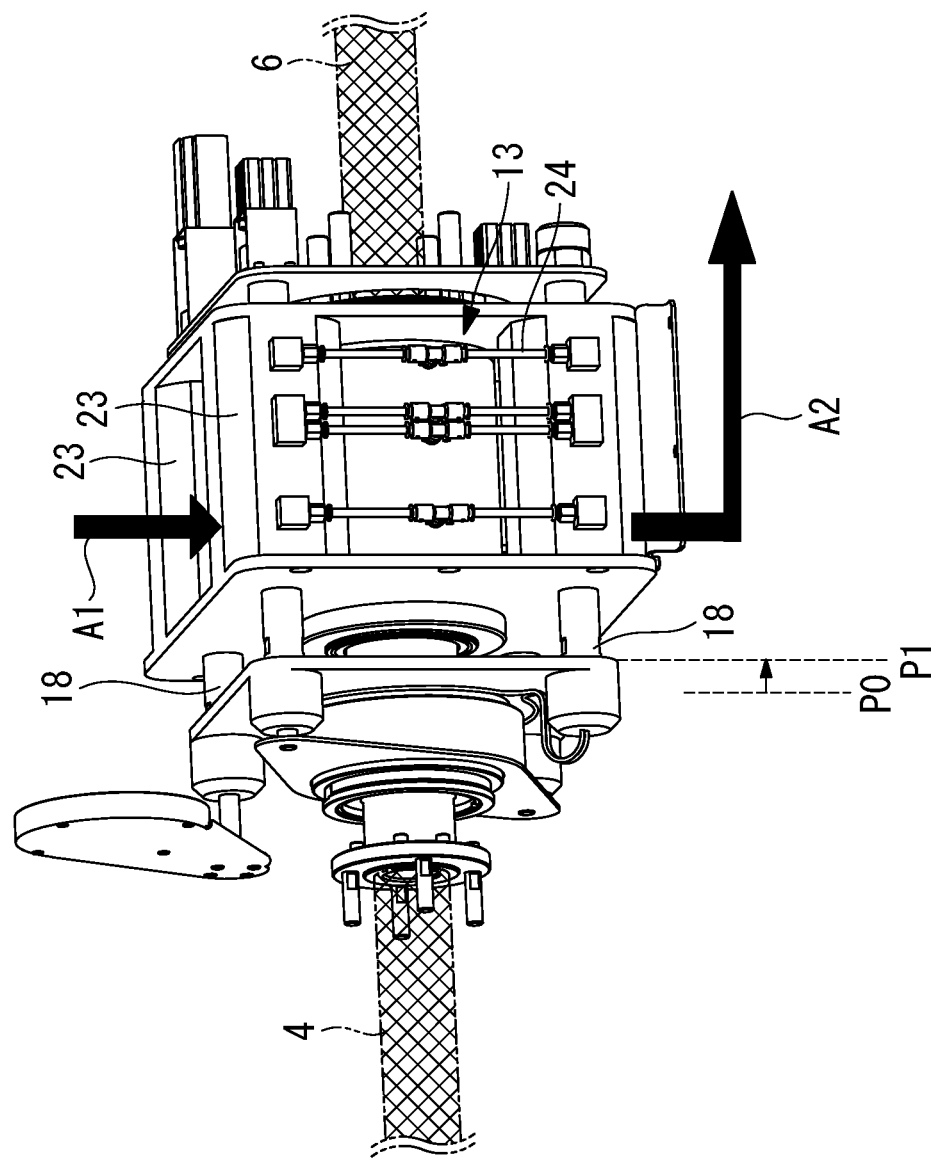
FIG. 10 is a perspective view illustrating a pre-transfer washing process with the plug at a first forward position.

As shown in FIG. 10, the plug 3 is displaced from the position shown in FIG. 9 to a first forward position P1 by being pulled toward the socket body 13. Specifically, this is automatically done under instructions of the controller by axially moving the support shaft bodies 18 with air supplied from the air supply pipes 24 to the corresponding cylinders 23. Then, as indicated by arrows A1 and A2 in FIG. 10, a space between the distal end of the plug and the socket 5 is washed with pure water, and then dried with inert gas, such as nitrogen. During the pre-transfer washing step, the valve body 33a (see FIG. 4) of the plug 3 and the valve body 13a of the socket 5 are at closed positions, blocking the respective channels.

<Fluid Transfer Step>

Figure 11:
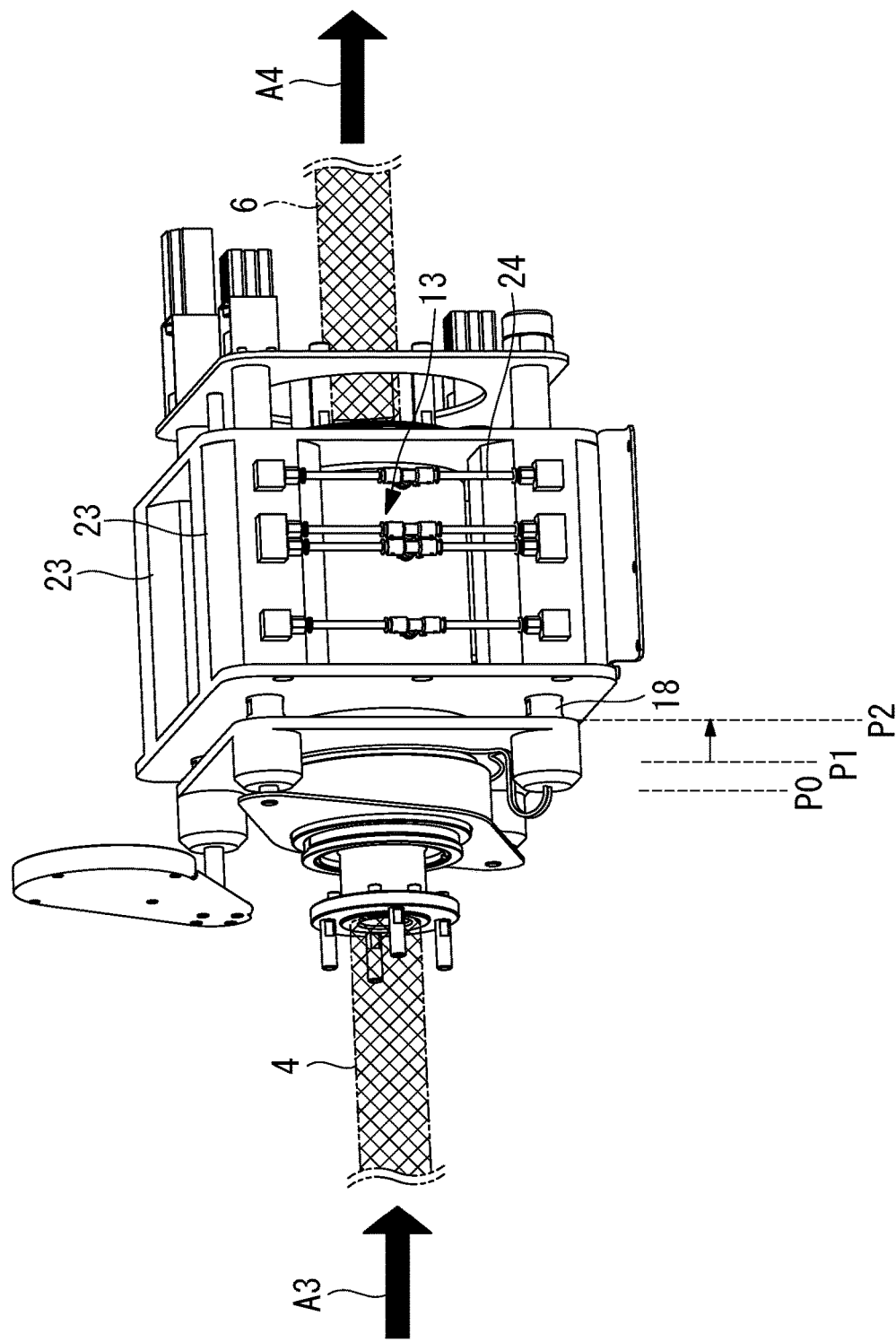
FIG. 11 is a perspective view illustrating a fluid transfer process with the plug at a second forward position.

Then, as shown in FIG. 11, the plug 3 is displaced from the first forward position P1 shown in FIG. 10 to a second forward position P2 by being pulled further toward the socket body 13. Specifically, this is automatically done under instructions of the controller by axially moving the support shaft bodies 18 with air supplied from the air supply pipes 24 to the corresponding cylinders 23. In this way, the plug 3 can be advanced from an initial position P0 of FIG. 9 to the first forward position P1 of FIG. 10 and the second forward position P2 of FIG. 11 in two steps.

With the plug 3 at the second forward position P2, the protrusion 33c (see FIG. 4) of the valve body 33a of the plug 3 abuts against the protrusion of the valve body 13a of the socket 5 to push against each other, which displaces the valve bodies 33a, 13a to open positions to open the respective channels. This allows the fluid to be transferred from the tanker truck to the buffer tank in the building via the fluid transfer connector 1, as indicated by arrows A3 and A4.

<Post-Transfer Washing Step>

Figure 12:
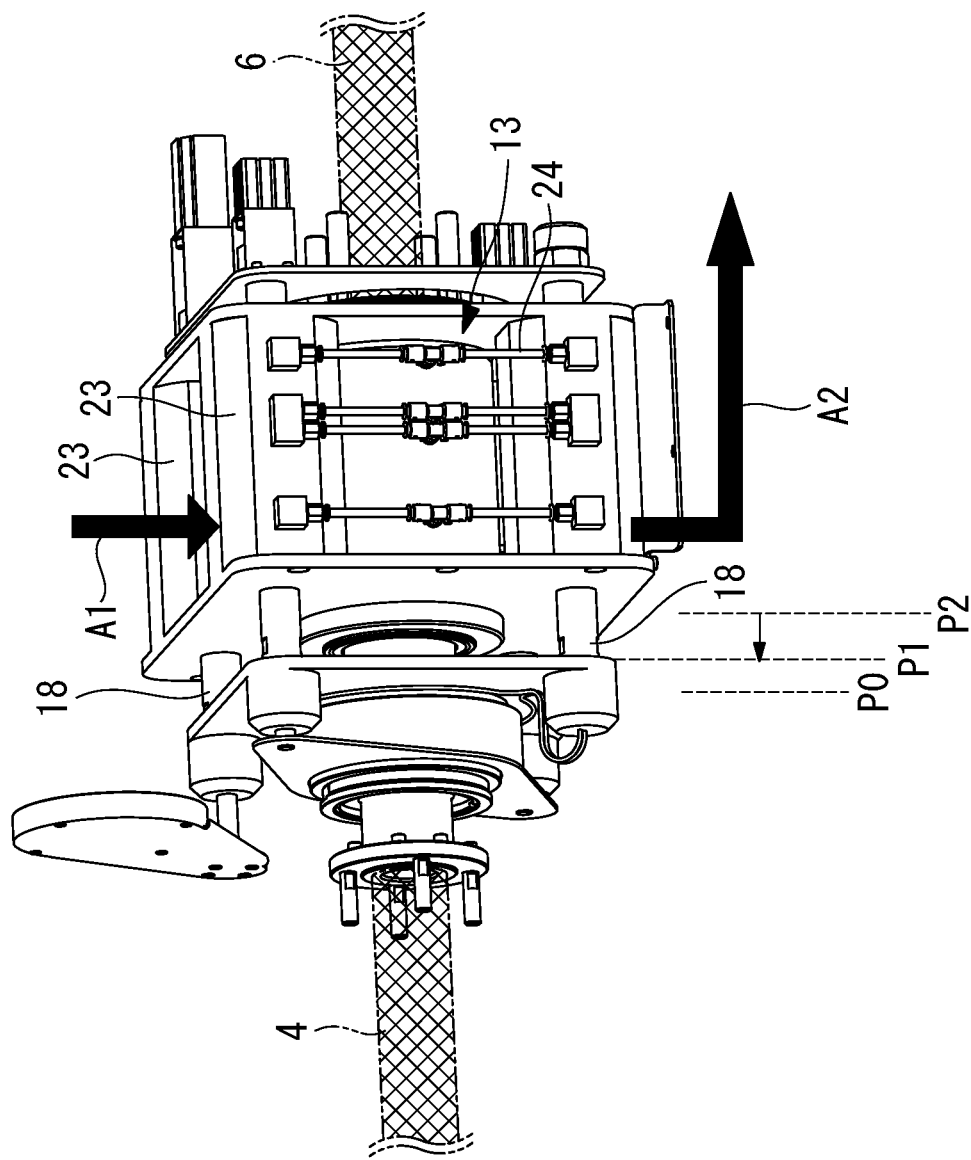
FIG. 12 is a perspective view illustrating a post-transfer washing process with the plug at the first forward position.

As shown in FIG. 12, upon completion of the fluid transfer, the plug 3 is retracted to the first forward position P1 as explained in FIG. 10. Then, the space between the distal end of the plug 3 and the socket 5 is washed with pure water, as indicated by allows A1 and A2, and then dried with inert gas, such as nitrogen. During the post-transfer washing step, the valve body 33a (see FIG. 4) of the plug 3 and the valve body 13a of the socket 5 are at closed positions, blocking the respective channels.

<Removing Step>

Upon completion of the post-transfer washing step shown in FIG. 12, the plug 3 is retracted to the initial position P0 shown in FIG. 9, and under instructions of the controller, the sleeve driving plate 19 is driven to move the sleeve 22 toward the distal end of the plug 3 (toward the right side in FIG. 12). This makes the plug 3 unlocked from the lock balls 9, and the plug 3 is thus removed from the socket 5.

The present embodiment provides the following functions and effects.

As shown in FIG. 6, the key plate 30 includes two or more keys 32. This ensures a one-to-one correspondence between the plug 3 and the socket 5, helping to avoid wrong connection.

As shown in FIG. 4, the first fixing ring 39 includes on its outer periphery the key plate 30 that is revolvable relative to the plug body 3A. This eliminates the need for rotating the plug body 3A and, moreover, the hose 4 fixed to the plug body 3A, in order to position the keys 32 with respect to the key grooves 11 on the socket 5. This can relieve the worker of a heavy burden of rotating the plug 3 with the hose 4 to position the keys 32 with respect to the key grooves 11. In particular, the hose 4 used to transfer a liquid chemical from the tanker truck is thick (e.g., inner diameter of 25 mm or more) and rigid, and accordingly the work can be extremely easy.

One of the keys 32 has a larger circumferential width than that of the other keys 32, making it recognizable as the main key 32a. This allows to easily position the key plate 30 in the rotational direction by using the main key 32a as a reference.

Positioning the main key 32a at the vertically upper position allows the worker to easily recognize the main key 32a from above. The worker can thus connect the plug without feeling any trouble.

In the present embodiment, the key plate 30 is revolvable. The present disclosure is, however, not limited to this embodiment; the key plate 30 only need to be rotatable in a predetermined angle range required for positioning of the keys 32, which may be less than 360°.

In the present embodiment, the keys 32 are provided on the plug 3 and the key grooves 11 are provided on the socket 5. This arrangement, however, may be reversed such that the key grooves are provided on the plug 3 and the keys are provided on the socket 5.

Considering the high rigidity of the hose 4, the fluid to be transferred is preferably liquid rather than gas, but the present disclosure is of course applicable to gas.

REFERENCE SIGNS LIST

1 Fluid transfer connector
3 Plug
3A Plug body
4 Hose
5 Socket
6 Pipe
8 Insertion port
9 Lock ball
10 Insertion cylinder
11 Key groove
11a Main key groove
13 Socket body
13a Valve body
15 Front fixing plate
16 Rear fixing plate
17 Leg
18 Support shaft body
18a First support shaft body
18a1 Lid driving shaft body
18b Second support shaft body
18b1 Sleeve driving plate shaft body
18c Third support shaft body
18c1 Sleeve driving plate shaft body
18d Fourth support shaft body
18d1 Sensor wire
19 Sleeve driving plate
20 Front support plate
21 Rear support plate
22 Sleeve
22a Distal end
23 Cylinder
24 Air supply pipe
27 Lid
29a First actuator
29b Second actuator
29c Third actuator
30 Key plate (ring body)
30a Small-diameter part
32 Key
32a Main key
33 Distal cylinder
33a Valve body
33b Spring
33c Protrusion
34 Intermediate cylinder
35 Proximal cylinder
37 O-ring
39 First fixing ring
39a Recess
39b Shoulder
39c Female threaded part
41 Second fixing ring
41a Flange
41b Shoulder
41c Male threaded part
43 Lock nut
45 Bolt
47 O-ring
49 Proximal flange
50 Bolt
51 Nut 52 Fixing bolt
53 Hose fixing flange
L1 Plug central axis
P0 Initial position
P1 First forward position
P2 Second forward position

The invention claimed is:

1. A fluid transfer connector plug comprising:
a plug body having a proximal end and a distal end, the proximal end allowing a hose to be fixed thereto, the distal end being removably connected to a socket, the plug body including a fluid channel communicating with the hose;
a ring body on an outer periphery of the plug body, the ring body being rotatable relative to the plug body; and
two or more keys or two or more key grooves on the ring body, wherein
a portion of the keys or the key grooves connected to the socket on the ring body is configured to be positioned to a rear part of the plug body, the rear part being closer the proximal end of the plug body than the distal end of the plug body which is inserted into an insertion port of the socket in a state where the plug body is connected to the socket.

2. The fluid transfer connector plug according to claim 1, further comprising a main key or a main key groove, the main key or the main key groove having a larger width in the rotational direction of the ring body than a width of each of the other keys or the key grooves in the rotational direction of the ring body.

3. A fluid transfer connector socket, wherein the socket is connected with the fluid transfer connector plug according to claim 1, and
the socket comprises key grooves or keys respectively corresponding to the keys or the key grooves of the plug.

4. The fluid transfer connector plug according to claim 1, further comprising a valve body configured to be contained in the distal end and to open and close the fluid channel, wherein
the valve body is configured to open the fluid channel in a state where the keys or the key grooves on the ring body is engaged with key grooves or keys of the socket.

5. A fluid transfer connector comprising:
a fluid transfer connector plug, comprising:
a plug body having a proximal end and a distal end, the proximal end allowing a hose to be fixed thereto, the distal end being removably connected to a fluid transfer connector socket, the plug body including a fluid channel communicating with the hose;
a ring body on an outer periphery of the plug body, the ring body being rotatable relative to the plug body, wherein the ring body is configured to be attached to a rear part of the plug body, the rear part being closer to the proximal end of the plug body than the distal end of the plug body which is inserted into an insertion port of the socket in a state where the plug body is connected to the socket; and
two or more keys or two or more key grooves on the ring body; and
a fluid transfer connector socket, wherein:
the fluid transfer connector socket is configured to be connected with the fluid transfer connector plug; and
the fluid transfer connector socket comprises key grooves or keys respectively corresponding to the keys or the key grooves of the plug.

6. A method for connecting a fluid transfer connector including a fluid transfer connector plug and a fluid transfer connector socket, the plug comprising: a plug body including a proximal end and a distal end, the proximal end allowing a hose to be fixed thereto, the distal end being removably connected to the socket, the plug body including a fluid channel communicating with the hose; a ring body on an outer periphery of the plug body, the ring body being rotatable relative to the plug body; and two or more keys or two or more key grooves on the ring body, the socket comprising key grooves or keys respectively corresponding to the keys or the key grooves of the plug, the method comprising:
inserting the distal end of the plug body into an insertion port of the socket; and
connecting the plug to the socket in a state where the distal end of the plug body is inserted into the insertion port of the socket,
wherein the connecting the plug to the socket is performed after engaging the keys or the key grooves of the plug with the key grooves or the keys of the socket, and
wherein a portion of the keys or the key grooves on the ring body is configured to be positioned to a rear part of the plug body, the rear part being closer the proximal end of the plug body than the distal end of the plug body.

7. The method for connecting a fluid transfer connector according to claim 6, wherein
the plug comprises a main key or a main key groove, the main key or the main key groove having a larger width in the rotational direction of the ring body than a width of each of the keys or the key grooves in the rotational direction of the ring body,
the socket comprises a main key groove or a main key respectively corresponding to the main key or the main key groove of the plug, and
the connecting the plug to the socket is performed after rotating the ring body such that the main key or the main key groove of the plug is positioned at a vertically upper position.

8. The method for connecting a fluid transfer connector according to claim 6, wherein the fluid transfer connector plug includes a valve body configured to be contained in the distal end and to open and close the fluid channel, wherein
the valve body is configured to open the fluid channel in a state where the keys or the key grooves on the ring body is engaged with key grooves or keys of the socket.

* * * * *